(12) United States Patent
Bowe et al.

(10) Patent No.: US 7,217,741 B2
(45) Date of Patent: May 15, 2007

(54) CATALYTIC REACTOR AND PROCESS

(75) Inventors: Michael Joseph Bowe, Preston (GB); Clive Derek Lee-Tuffnell, Poole (GB)

(73) Assignee: Compactgtl PLC, London (GB)

( * ) Notice: Subject to any disclaimer, the term of this patent is extended or adjusted under 35 U.S.C. 154(b) by 12 days.

(21) Appl. No.: 10/536,726

(22) PCT Filed: Nov. 27, 2003

(86) PCT No.: PCT/GB03/05198

§ 371 (c)(1),
(2), (4) Date: May 27, 2005

(87) PCT Pub. No.: WO2004/050799

PCT Pub. Date: Jun. 17, 2004

(65) Prior Publication Data

US 2006/0041029 A1   Feb. 23, 2006

(30) Foreign Application Priority Data

Dec. 2, 2002 (WO) .................. PCT/GB02/05443
Jun. 25, 2003 (GB) ................... 0314790.7

(51) Int. Cl.
C07C 27/00 (2006.01)
(52) U.S. Cl. ................... 518/706; 518/700
(58) Field of Classification Search ........ 518/700, 518/706
See application file for complete search history.

(56) References Cited

U.S. PATENT DOCUMENTS

| | | | |
|---|---|---|---|
| 4,199,523 A | 4/1980 | Rottig | 260/449.6 R |
| 5,545,674 A | 8/1996 | Behrmann | |
| 5,670,269 A | 9/1997 | Hamada | 429/20 |
| 6,180,846 B1 | 1/2001 | Dandekar | 585/443 |
| 6,211,255 B1 | 4/2001 | Schanke | 518/715 |
| 6,220,497 B1 | 4/2001 | Benz | |
| 6,228,341 B1 | 5/2001 | Hebert | |
| 6,284,217 B1 | 9/2001 | Wang | |
| 6,294,138 B1 | 9/2001 | Von Hippel | |
| 6,451,864 B1 | 9/2002 | Wang | |
| 6,558,634 B1 | 5/2003 | Wang | |
| 6,616,909 B1 | 9/2003 | Tonkovich | |
| 6,680,044 B1 | 1/2004 | Tonkovich | |
| 6,750,258 B2 | 6/2004 | Wang | |
| 7,067,561 B2* | 6/2006 | Bowe | 518/706 |
| 2002/0143075 A1 | 10/2002 | Agee | |
| 2003/0018089 A1* | 1/2003 | Schweitzer et al. | 518/728 |
| 2004/0102530 A1 | 5/2004 | Borsa | |
| 2005/0165121 A1 | 7/2005 | Wang | |
| 2005/0176832 A1 | 8/2005 | Tonkovich | |
| 2005/0203195 A1 | 9/2005 | Wang | |

FOREIGN PATENT DOCUMENTS

| | | |
|---|---|---|
| DE | 19654361 | 6/1998 |
| FR | 2824755 | 11/2002 |
| WO | 01/51194 | 7/2001 |
| WO | 03/033131 | 4/2003 |
| WO | 03/033133 | 4/2003 |
| WO | 03/033134 | 4/2003 |

* cited by examiner

Primary Examiner—J. Parsa
(74) Attorney, Agent, or Firm—William H. Holt

(57) ABSTRACT

Fischer-Tropsch synthesis is performed using a compact catalytic reactor unit (10) defining channels in which is a gas-permeable catalyst structure (16), the channels extending between headers (18). The synthesis occurs in at least two stages, as the reactor unit provides at least two successive channels (14, 14a) for the Fischer-Tropsch synthesis connected by a header, the gas flow velocity through the first channel being sufficiently high that no more than 65% of the carbon monoxide undergoes conversion. The gases are cooled (25) in the header between the two stages, so as to condense water vapor, and then pass through the second channel at a sufficiently high gas flow velocity that no more than 65% of the remaining carbon monoxide undergoes conversion. This lowers the partial pressure of water vapor and so suppresses oxidation of the catalyst.

9 Claims, 1 Drawing Sheet

CATALYTIC REACTOR AND PROCESS

This invention relates to a chemical process, and to catalytic reactors suitable for use in performing the process.

BACKGROUND OF THE INVENTION

A process is described in WO 01/51194 (Accentus plc) in which methane is reacted with steam, to generate carbon monoxide and hydrogen in a first catalytic reactor; the resulting gas mixture is then used to perform Fischer-Tropsch synthesis in a second catalytic reactor. The overall result is to convert methane to hydrocarbons of higher molecular weight, which are usually liquid or solid under ambient conditions. The two stages of the process, steam/methane reforming and Fischer-Tropsch synthesis, require different catalysts, and catalytic reactors are described for each stage. The catalytic reactors enable heat to be transferred to or from the reacting gases, respectively, as the reactions are respectively endothermic and exothermic; the heat required for steam/methane reforming is provided by gas combustion. A known catalyst for the Fischer-Tropsch synthesis utilises small particles of cobalt on a ceramic support, but it has been found that this catalyst can suffer oxidation or an irreversible reaction with the ceramic support in the presence of water vapour, with a resultant decrease in activity. An improved way of performing this process has now been found.

SUMMARY OF THE INVENTION

According to the present invention there is provided a process for performing Fischer-Tropsch synthesis using at least one compact catalytic reactor unit defining channels for the Fischer-Tropsch synthesis reaction in which there is a gas-permeable catalyst structure, wherein a carbon-monoxide-containing gas undergoes Fisher-Tropsch synthesis in at least two successive stages, the gas flow velocity in the first stage being sufficiently high that no more than 70% of the carbon monoxide undergoes the synthesis reaction in the first stage, the gases being cooled between the successive stages so as to condense water vapour, and the gas flow velocity in the second stage being sufficiently high that no more than 70% of the remaining carbon monoxide undergoes the synthesis reaction in the second stage.

Preferably in both the first stage and the second stage the space velocity is above 1000/hr, but preferably no greater than 15000/hr. Preferably the process is operated so that water vapour does not exceed 20 mole %. Preferably, in each stage, no more than 65% of the carbon monoxide undergoes conversion.

The space velocity, in this specification, is defined as the volume flow rate of the gases supplied to the reactor (measured at STP), divided by the void volume of the reactor. Thus, if the reactor is at 210° C. and a pressure of 2.5 MPa, a space velocity of 5000/hr corresponds to a gas flow (at operating conditions) of about 354 times the void volume per hour, and so to a residence time of about 10 s.

Thus the invention also provides a process for performing Fischer-Tropsch synthesis on a gas containing hydrogen and carbon monoxide using at least one compact catalytic reactor unit defining channels for the Fischer-Tropsch synthesis reaction in which there is a gas-permeable catalyst structure, wherein the synthesis reaction is performed in at least two successive stages, at a sufficiently high gas flow velocity that water vapour does not exceed 20 mole %, and that between successive stages the gases are cooled so as to condense water vapour.

The invention also provides an apparatus for performing such a Fischer-Tropsch synthesis. This may be a compact catalytic reactor unit incorporating headers that connect successive flow channels, the headers enclosing means to condense water vapour and to remove condensed liquids from the header. The catalytic reactor unit preferably comprises a plurality of metal sheets arranged as a stack and bonded together to define channels for the Fischer-Tropsch synthesis alternating with channels for a heat exchange fluid. Preferably the temperature in the synthesis channels is above 190° C., for example 200° C. Corrugated or dimpled foils, metal meshes, or corrugated or pleated metal felt sheets may be used as the substrate of the catalyst structure within the flow channels to enhance heat transfer and catalyst surface area.

It will be appreciated that the materials of which the reactor are made are subjected to a corrosive atmosphere in use. The reactor may be made of a metal such as an aluminium-bearing ferritic steel, for example it might comprise iron with 15% chromium, 4% aluminium, and 0.3% yttrium (eg Fecralloy (™)). When this metal is heated in air it forms an adherent oxide coating of alumina which protects the alloy against further oxidation; this oxide layer also protects the alloy against corrosion. Where this metal is used as a catalyst substrate, and is coated with a ceramic layer into which a catalyst material is incorporated, the alumina oxide layer on the metal is believed to bind with the oxide coating, so ensuring the catalytic material adheres to the metal substrate. Other stainless steels may also be used. The sheets defining the channels may alternatively be of aluminium.

BRIEF DESCRIPTION OF THE DRAWINGS

The invention will now be further and more particularly described, by way of example only, and with reference to the accompanying drawings, in which.

DETAILED DESCRIPTION OF THE INVENTION

The invention relates to Fischer-Tropsch synthesis, which may form part of a process for converting methane to longer chain hydrocarbons. Fischer-Tropsch synthesis is a reaction between carbon monoxide and hydrogen, and this gas mixture may for example be generated by steam/methane reforming. In Fischer-Tropsch synthesis the gases react to generate a longer chain hydrocarbon, that is to say:

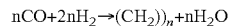

$$nCO+2nH_2 \rightarrow (CH_2))_n + nH_2O$$

which is an exothermic reaction, occurring at an elevated temperature, typically between 190 and 350° C., for example 210° C., and an elevated pressure typically between 2 MPa and 4 MPa, for example 2.5 MPa, in the presence of a catalyst such as iron, cobalt or fused magnetite, with a promoter. The exact nature of the organic compounds formed by the reaction depends on the temperature, the pressure, and the catalyst, as well as the ratio of carbon monoxide to hydrogen.

A preferred catalyst comprises a coating of gamma-alumina of specific surface area 140–450 $m^2/g$ with about 10-40% (by weight compared to the weight of alumina) of cobalt, and with a ruthenium/platinum promoter, the promoter being between 0.01% to 10% of the weight of the cobalt. There may also be a basicity promoter such as gadolinium oxide. The activity and selectivity of the catalyst depends upon the degree of dispersion of cobalt metal upon the support, the optimum level of cobalt dispersion being typically in the range 0.1 to 0.2, so that between 10% and 20% of the cobalt metal atoms present are at a surface. The larger the degree of dispersion, clearly the smaller must be the cobalt metal crystallite size, and this is typically in the range 5–15 nm. Cobalt particles of such a size provide a high level of catalytic activity, but may be oxidised in the presence of water vapour, and this leads to a dramatic reduction in their catalytic activity. The extent of this oxidation depends upon the proportions of hydrogen and water vapour adjacent to the catalyst particles, and also their temperature, higher temperatures and higher proportions of water vapour both increasing the extent of oxidation.

Figure 1:
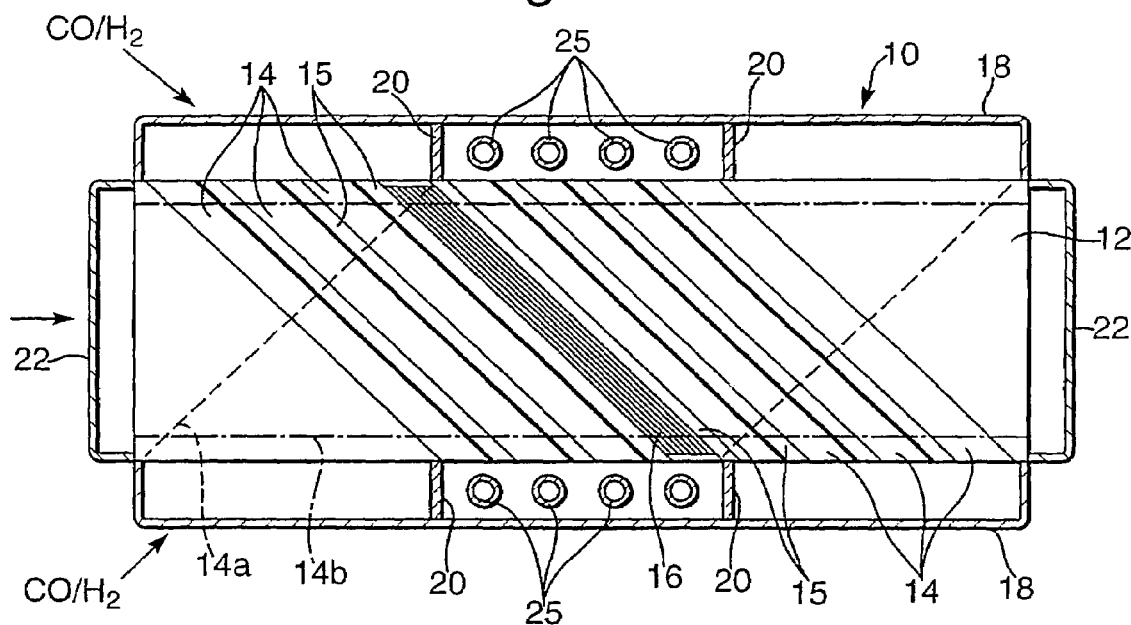
FIG. 1 shows a sectional view of a reactor suitable for performing Fischer-Tropsch synthesis, showing a plate in plan.

Referring now to FIG. 1 a reactor 10 for Fischer-Tropsch synthesis comprises a stack of Fecralloy steel plates 12, each plate being generally rectangular, 450 mm long and 150 mm wide and 6 mm thick, these dimensions being given only by way of example. On the upper surface of each such plate 12 are rectangular grooves 14 of depth 5 mm separated by lands 15 (eight such grooves being shown), but there are three different arrangements of the grooves 14. In the plate 12 shown in the drawing the grooves 14 extend diagonally at an angle of 45° to the longitudinal axis of the plate 12, from top left to bottom right as shown. In a second type of plate 12 the grooves 14a (as indicated by broken lines) follow a mirror image pattern, extending diagonally at 45° from bottom left to top right as shown. In a third type of plate 12 the grooves 14b (as indicated by chain dotted lines) extend parallel to the longitudinal axis.

The plates 12 are assembled in a stack, with each of the third type of plate 12 (with the longitudinal grooves 14b) being between a plate with diagonal grooves 14 and a plate with mirror image diagonal grooves 14a, and after assembling many plates 12 the stack is completed with a blank rectangular plate. The plates 12 are compressed together and subjected to a heat treatment to bring about diffusion bonding or they are brazed together, so they are sealed to each other. Corrugated Fecralloy alloy foils 16 (only one is shown) 50 microns thick coated with a ceramic coating impregnated with a catalyst material, of appropriate shapes and with corrugations 5 mm high, can be slid into each such diagonal groove 14 or 14a.

More preferably pairs of corrugated catalyst-coated foils 16 with corrugations about 2.4 mm high are stacked together with a flat catalyst-coated foil between them, and spot welded together, before being slid into the grooves 14 or 14a.

Header chambers 18 are welded to the stack along each side, each header 18 defining three compartments by virtue of two fins 20 that are also welded to the stack. The fins 20 are one third of the way along the length of the stack from each end, and coincide with a land 15 (or a portion of the plates with no groove) in each plate 12 with diagonal grooves 14 or 14a. Coolant headers 22 in the form of rectangular caps are welded onto the stack at each end, communicating with the longitudinal grooves 14b. In a modification (not shown), in place of each three-compartment header 18 there might instead be three adjacent header chambers, each being a rectangular cap like the headers 22. Within each of the central compartments of the headers 18 there are coolant tubes 25 that extend the entire height of the stack. At the base of each of these central compartments is an outlet duct (not shown) through which liquids condensing onto the tubes 25 can emerge. For use, the reactor 10 is arranged with the plates 12 in substantially horizontal planes so that the coolant tubes 25 are substantially vertical.

In use of the reactor 10 the mixture of carbon monoxide and hydrogen is supplied to the compartments of both headers 18 at one end (the left hand end as shown) of the stack, and so gases produced by Fischer-Tropsch synthesis emerge through the compartments of both headers 18 at the right hand end as shown. The flow path for the mixture supplied to the top-left header compartment (as shown), for example, is through the diagonal grooves 14 into the bottom-middle header compartment, and then to flow through the diagonal grooves 14a in other plates in the stack into the top-right header compartment. A coolant is supplied to the header 22 at the same end of the stack, to maintain the temperature within the reactor 10 at about 210° C., so that the coolant is at its lowest temperature at the area where heat generation is at its maximum during the first stage. Hence the flows of the reacting gases and the coolant are at least partially co-current. The intention is to approach isothermal conditions throughout the reactor 10; this has the advantage of minimising the risk of any wax (i.e. very long chain hydrocarbon) blocking the flow channels towards the outlet from the reaction channels if the local temperature drops below about 190° C. (If wax deposits occur, they may be removed by raising the coolant temperature by between 5° and 15° C., and feeding hydrogen-rich tail gas through the reactor.) The flow rate (space velocity) of the reacting gases is in the range 1000–15000/hr, so as to ensure that the conversion of carbon monoxide is only about 60% or less by the time the gases reach the middle compartments of the headers 18.

The coolant tubes 25 are supplied with coolant at a different temperature so that they are cooler, for example at 150° C. (which is below the boiling point of water at the pressure in the reactor). Consequently water vapour (and some of the longer-chain hydrocarbons) condense on the outer surface of the coolant tubes 25, and runs down those tubes 25 to emerge from the outlet duct (not shown) at the bottom of the stack. This significantly reduces the partial pressure of water vapour in the gas mixture that flows on into the next set of diagonal grooves 14 or 14a. The result is that the Fischer-Tropsch synthesis takes place in two successive stages—the first stage being as the gas flows from the inlet compartments of the headers 18 to the middle compartments; and the second stage being as the gas flows from the middle compartments to the outlet compartments—and at least part of the water vapour generated in the first stage is removed from the gas stream before it enters the second stage.

It will be appreciated that the reactor 10 may be modified in various ways, and that in particular the plates 12 may be of different thicknesses. For example the plates 12 defining the diagonal grooves 14 and 14a in which Fischer-Tropsch synthesis takes place might be 10 mm thick with grooves 9 mm deep, while the plates 12 with longitudinal grooves 14b for the coolant might be only 4 mm thick with 3 mm deep grooves. In this case the corrugated foils 16 might be replaced by a stack of say three or four corrugated foils which may be spot welded together so the overall height is 9 mm. Such deeper grooves provide an advantage if any waxy material is produced, as they are less vulnerable to blockage. Channels greater than about 2 mm deep improve the bulk transport properties of the corrugated catalyst insert 16; in the case of Fischer-Tropsch synthesis this enables efficient drainage and removal of liquid products, and transfer of reactant gases to the surface of the catalyst. The pitch or pattern of the corrugated foils 16 may vary along a reactor channel 14 or 14a to adjust catalytic activity, and hence provide for control over the temperatures or reaction rates at different points in the reactor 10. Furthermore the diagonal grooves may decrease in width, and possibly also depth, along their length, so as to vary the fluid flow conditions, and the heat or mass transfer coefficients.

Figure 2:
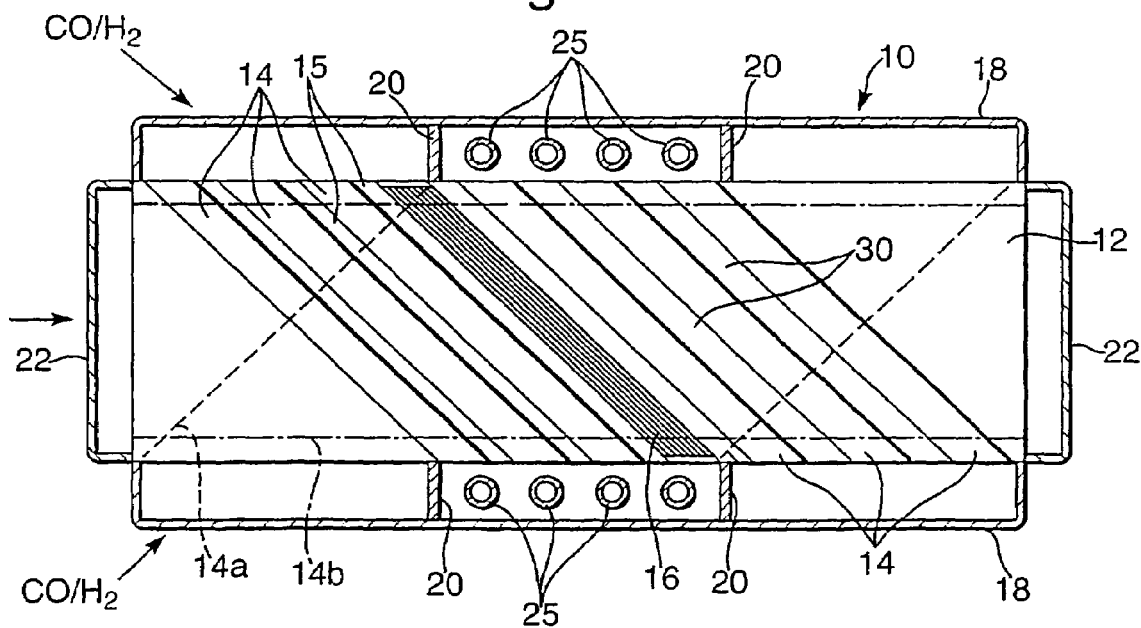
FIG. 2 shows a modification of the reactor of FIG. 1.

During the synthesis reaction the gas volume decreases, and by appropriate tapering of the channels 14 the gas velocity may be maintained as the reaction proceeds, to maintain the target conversion. An alternative way of maintaining the gas velocity is to decrease the number of flow channels, as shown in FIG. 2, to which reference is now made. This shows a view corresponding to that of FIG. 1. The only difference is that the diagonal grooves 14 (and 14a) defining the second stage of the Fischer-Tropsch synthesis, that is to say the grooves 14 (and 14a) between the middle compartment and the right hand compartment of the headers 18, are separated by wider lands 30, so that there are only three such grooves in each plate 12.

It will also be appreciated that a modified reactor might provide more stages, for example being a three stage Fischer-Tropsch reactor, the headers 18 defining four successive compartments along each side of the reactor, and with condenser tubes 25 in each of the two middle compartments. The overall conversion may be substantially the same, for example two 60% conversion stages and three 50% conversion stages would each provide an overall conversion above 80%.

Removal of the water vapour and the lower boiling point hydrocarbons onto the condenser tubes 25 not only lowers the partial pressure of water vapour and so suppresses the oxidation of the catalyst, but has the further benefit of removing at least some of those hydrocarbons that would form a liquid layer on the catalyst structure. Any such a liquid layer inhibits contact of the gas mixture with the catalyst particles and inhibits diffusion of the product hydrocarbons away from the catalyst particles, so removal of the hydrocarbons liquid minimises these diffusional resistances.

In FIGS. 1 and 2 only four condenser tubes 25 are shown in each middle compartment, but it will be appreciated that there might be a different number of tubes, for example ten or more. And to enhance heat transfer each tube 25 may be provided with fins, preferably fins extending longitudinally so that flow of condensed liquid down the tube 25 is not impeded. Not only does water vapour condense on the tubes, but any liquid droplets entrained with the gas flow tend to impact with the surface of the tubes 25 and so are disengaged from the gas flow. As an alternative to the heat exchanger tubes 25 or other heat transfer surfaces, a spray condenser system may be provided within the middle compartments of the headers 18, which might use as the coolant fluid recycled products from the Fischer-Tropsch synthesis at about 150° C. This would be particularly beneficial if there is a risk of wax deposits fouling the heat exchanger surfaces.

Alternatively the cooling and condensation may be carried out separate from and outside the reactor. For example three reactors 10 as shown in FIG. 1 but without the cooling tubes 25 in the header might be arranged to carry gas flows in parallel, the conversion of CO being restricted to below 65% by controlling the reaction temperature and space velocity. The outlet gases from the three reactors are connected via a manifold to a condenser unit in which the water vapour and liquid hydrocarbon product is condensed. The remaining gases, with lowered water partial pressure, might then be supplied to a single such reactor 10 (again without the cooling tubes 25), so that again about 60% of the residual unreacted CO undergoes the synthesis reaction. The decrease in gas volume between the first stage and the second stage—because much of the gas has undergone synthesis and formed a liquid—is accommodated by reducing the number of reactor units from three to one, so as to maintain a high flow velocity.

Additional benefits of the high gas flow velocity are a reduction in the temperature variation across the reaction channels, by helping to redistribute the heat from the exothermic reactions at the surface of the catalyst into the gas phase. It also helps to entrain the liquid reaction products into the gas flow and to keep the catalyst surface free of waxy deposits.

The invention claimed is:

1. A process for performing Fischer-Tropsch synthesis using at least one compact catalytic reactor unit defining channels for the Fischer-Tropsch synthesis reaction in which there is a gas-permeable catalyst structure, characterized in that a carbon monoxide-containing gas undergoes Fischer-Tropsch synthesis in at least two successive stages, the gas flow velocity in the first stage being sufficiently high that no more than 70% of the carbon monoxide undergoes the synthesis reaction in the first stage, the gases being cooled between the successive stages so as to condense water vapour, and the gas flow velocity in the second stage being sufficiently high that no more than 70% of the remaining carbon monoxide undergoes the synthesis reaction in the second stage.

2. A process as claimed in claim 1 performed using a single reactor unit, wherein each stage of the synthesis reaction takes place in a set of channels within the reactor unit, and the gases are cooled within a header between successive stages.

3. A process as claimed in claim 1 wherein a carbon monoxide-containing gas stream flows through a plurality of first channels in parallel in the first stage, and then through a plurality of second channels in parallel in the second stage, the cross-sectional area of the plurality of second channels being less than that of the plurality of first channels.

4. A process as claimed in claim 3 wherein the number of second channels is less than the number of first channels.

5. A process as claimed in claim 3 wherein in both the first stage and the second stage the space velocity is above 1000/hr.

6. A process as claimed in claim 5 wherein, in both the first stage and the second stage the space velocity is no greater than 15000/hr.

7. A process as claimed in claim 5 wherein water vapour does not exceed 20 mole %.

8. A process as claimed in claim 5 wherein the gas flow velocity through both the first stage and the second stage is sufficiently high that no more than 65% of the carbon monoxide undergoes the synthesis reaction.

9. A process for performing Fischer-Tropsch synthesis on a gas containing hydrogen and carbon monoxide using at least one compact catalytic reactor unit defining channels for the Fischer-Tropsch synthesis in which there is a gas-permeable catalyst structure, wherein the synthesis is performed in at least two successive stages, at a sufficiently high gas flow velocity that water vapour does not exceed 20 mole %, and that between successive stages the gases are cooled so as to condense water vapour.

* * * * *